Jan. 7, 1941.　　　C. T. WALTER　　　2,227,683
EVENER AND STACKER
Filed Sept. 26, 1938　　　3 Sheets-Sheet 1

Charles T. Walter
INVENTOR

Jan. 7, 1941.    C. T. WALTER    2,227,683
EVENER AND STACKER
Filed Sept. 26, 1938    3 Sheets-Sheet 2
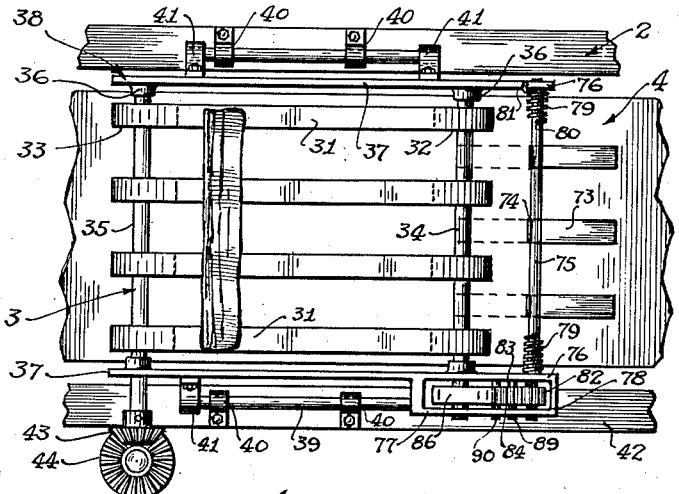
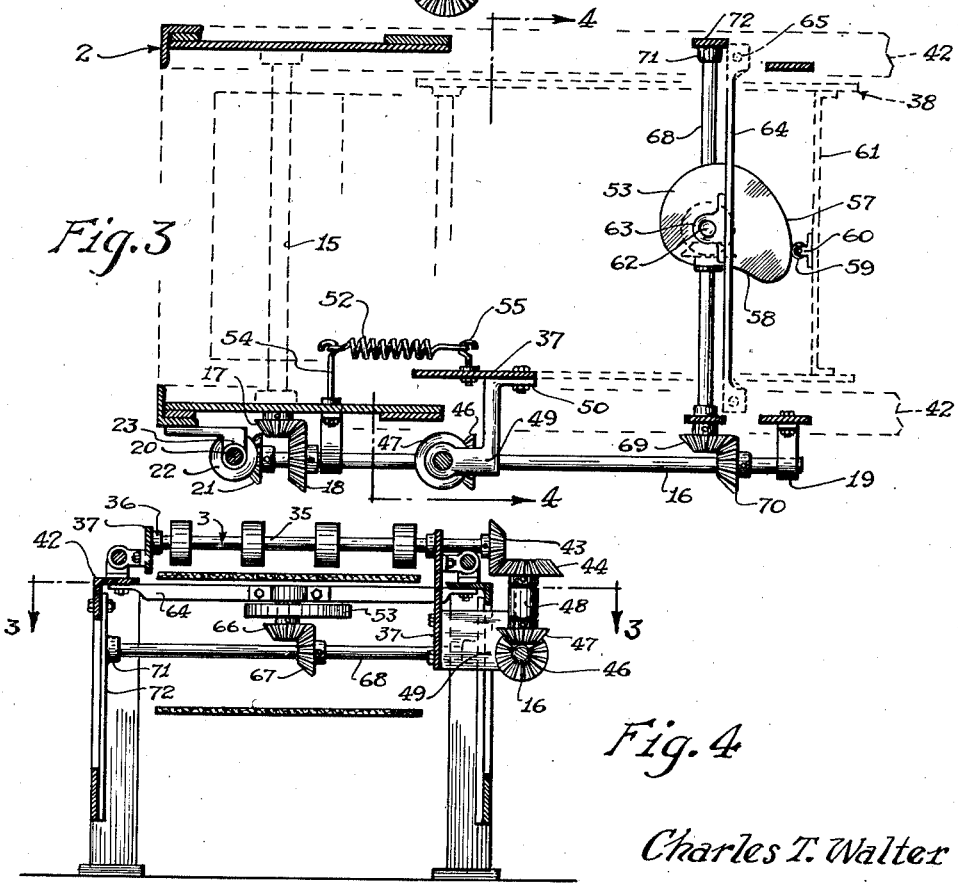
Charles T. Walter
INVENTOR Jan. 7, 1941.  C. T. WALTER  2,227,683
EVENER AND STACKER
Filed Sept. 26, 1938   3 Sheets-Sheet 3
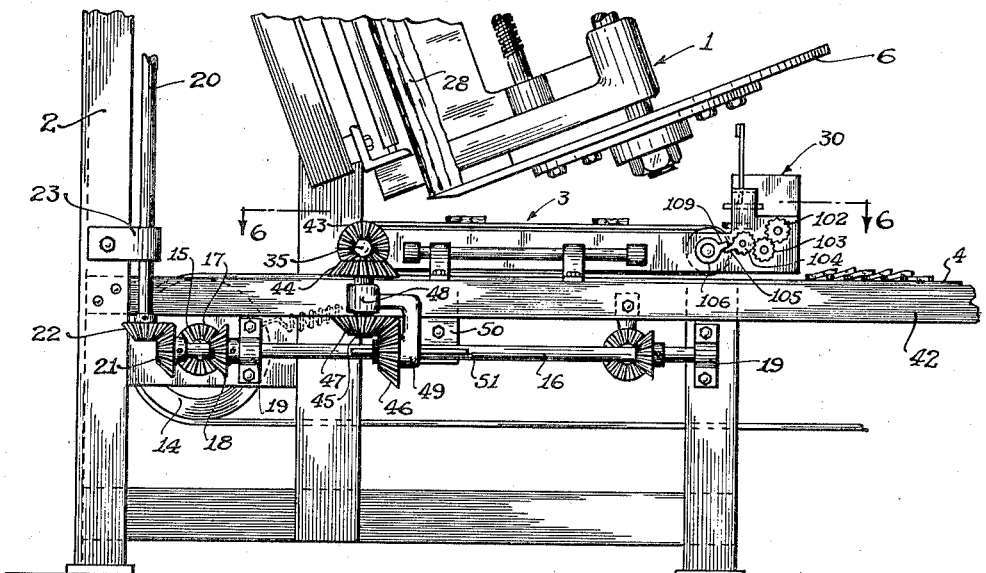
Charles T. Walter
INVENTOR Patented Jan. 7, 1941

2,227,683

UNITED STATES PATENT OFFICE 2,227,683

EVENER AND STACKER

Charles T. Walter, Chicago, Ill., assignor to Industrial Patents Corporation, Chicago, Ill., a corporation of Delaware Application September 26, 1938, Serial No. 231,834

23 Claims. (Cl. 146—94)

This invention relates to a slice spacing and grouping device.

One of the objects of the invention is to provide an improved slice spacing and grouping device.

Another object of the invention is to provide an improved slice spacing and grouping device especially adapted for use with meat slicing machines for slicing, for example, slabs of bacon.

Another object of the invention is to provide means for arranging spaced groups of slices of a predetermined number upon a conveying means, the slices of each group being arranged in overlapping relationship.

Other objects of the invention will be apparent from the description and claims which follow.

Reference is had to the drawings in which like characters of reference are used to designate similar elements.

Figure 2 is a plan view taken substantially on line 2—2 of Figure 1.

Figure 3 is a view taken substantially on line 3—3 of Figure 4. This figure shows the means for bodily moving the slice receiver conveyor.

Figure 4 is a view taken substantially on line 4—4 of Figure 3.

Figure 5 is a side view of a meat slicing machine and conveyor system, partly broken away, and shows another form of the slice spacing and grouping device of the present invention.

Figure 6 is a sectional view taken substantially on line 6—6 of Figure 5.

Figure 7 is a sectional view taken substantially on line 7—7 of Figure 6.

Figure 8 is a sectional view taken substantially on line 8—8 of Figure 6.

Figure 1:
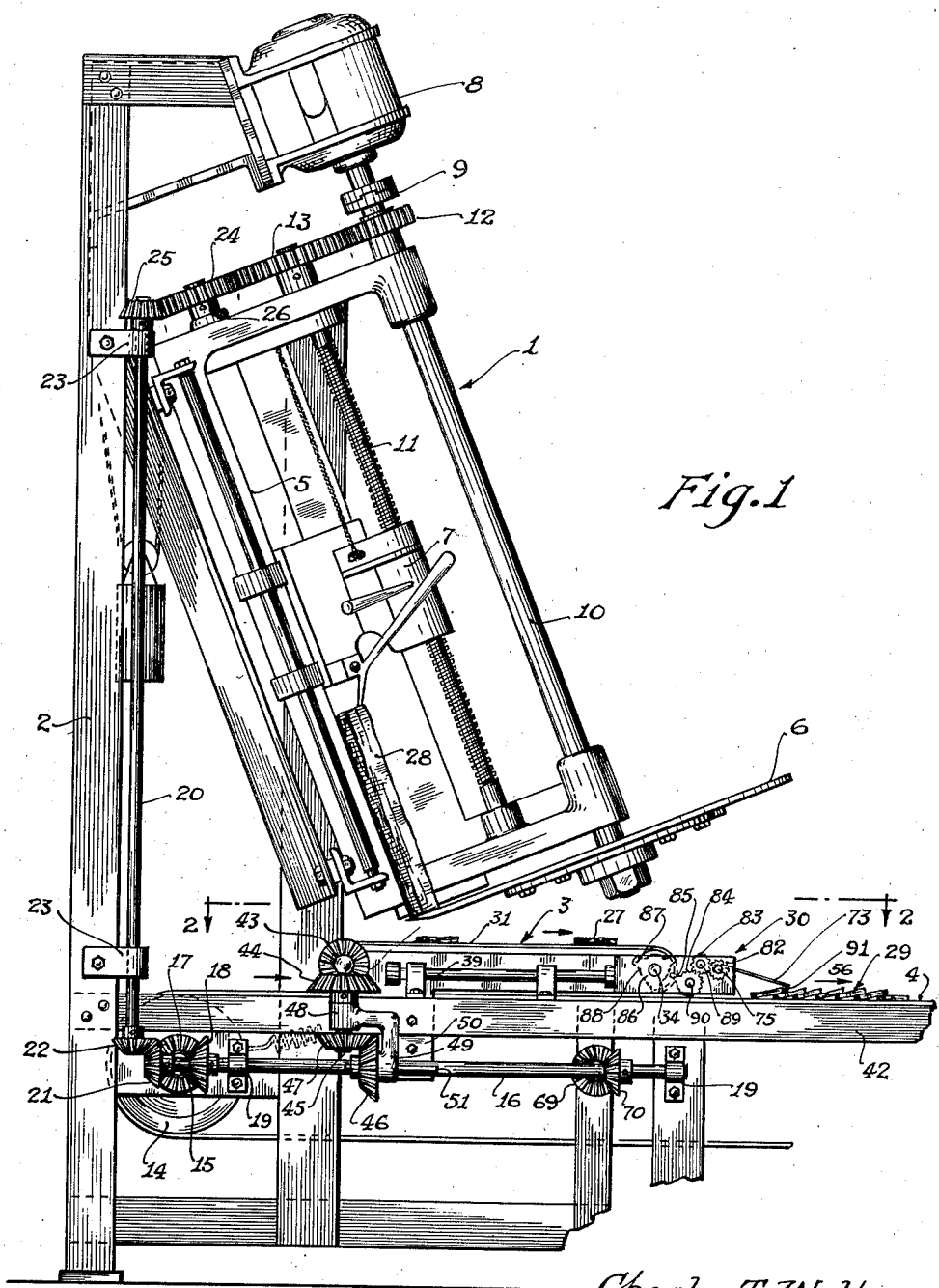
Figure 1 is a side view of a meat slicing and conveying system in which one form of the slice spacing and grouping device of the present invention is employed.

In the drawings, slicing machine 1 is shown mounted upon suitable framework 2 relative to slice receiver conveyor 3 and slice delivery conveyor 4.

Slicing machine 1 may be of the conventional continuous type comprising bed 5, cutter 6 and continuous feed means 7. Cutter 6 may be continuously driven by power transmitted from motor 8 through the medium of flexible coupling 9 and shaft 10. Feed means 7 may be continuously driven through the medium of threaded shaft 11 and meshed gears 12 and 13 respectively pinioned on shafts 10 and 11.

Conveyor 4 is shown positioned below slicing machine 1 and may be of the conventional endless belt type mounted upon suitable rollers, such as, for example, roller 14 rigidly secured to shaft 15. Shaft 15 is journaled in suitable bearings rigidly secured to framework 2. Conveyor 4 is continuously driven by power transmitted from driven shaft 16 through the medium of meshed gears 17 and 18 respectively pinioned to shafts 15 and 16. Shaft 16 is journaled in suitable bearings 19 rigidly secured to framework 2 and is driven from shaft 20 through the medium of meshed gears 21 and 22 respectively pinioned to shafts 16 and 20. Shaft 20 is journaled in suitable bearings 23 rigidly secured to framework 2 and is driven by power transmitted from motor 8 through the medium of meshed gears 12, 13, 24 and 25. Gear 24 is rotatably mounted on trunnion 26 rigidly secured to the framework of slicing machine 1. Gear 25 is pinioned to shaft 20.

It is the purpose of the present invention that bacon slices 27 severed from bacon slab 28 shall be deposited upon conveyor 4 in spaced groups 29 of slices of a predetermined number with the slices of each group being arranged in overlapped relationship. To accomplish this, there is provided intermediate slicing machine 1 and conveyor 4 and in longitudinal alignment with conveyor 4, a slice receiver conveyor 3 provided with means 30 for transferring the individual slices 27 to conveyor 4.

Conveyor 3 may be of the conventional endless spaced strand type comprising strands 31 mounted upon suitable pulleys 32 and 33 respectively pinioned to shafts 34 and 35. Shafts 34 and 35 are journaled in suitable bearings, such as, for example, bearings 36 mounted within side members 37 of framework 38 of conveyor 3.

Conveyor 3 is adapted also for bodily movement longitudinally of conveyor 4, and, as shown in Figures 1 and 2, is mounted upon bearing rods 39 slidably mounted in suitable bearings 40. Bearing rods 39 are bolted or otherwise rigidly secured as by brackets 41 to side members 37 of framework 38. Bearings 40 are bolted or otherwise rigidly secured to side members 42 of framework 2.

Conveyor strands 31 are continuously driven by power transmitted from driven shaft 16 through the medium of gears 43 and 44, shaft 45 and gears 46 and 47. Shaft 45 is journaled in bearings 48 formed integral with arm 49, which arm is rigidly secured as by bracket 50 to one of the side members 37 of framework 38. Gear 43 is pinioned to shaft 35 for mesh with gear 44 pinioned to shaft 45. Gear 47 is pinioned to shaft 45 for mesh with gear 46. Gear 46 is slidably mounted for movement longitudinally on shaft 16 and is positively rotated on shaft 16 through the medium of fixed key 51.

Bodily movement of conveyor 3 longitudinally of conveyor 4 is effected through the medium of spring 52 and cam 53. Spring 52 serves to normally urge conveyor 3 in its retracted position, that is, in its rearwardmost position relative to slicing machine 1, whereas cam 53 serves to alternately urge conveyor 3 against the action of coiled spring 52 to its forwardmost position, that is, in the direction indicated by the arrow designated by the numeral 56 as shown in Figure 1.

Spring 52 is rigidly secured at one end as by bracket 54 to one of the side members 42 of framework 2 and at its opposite end as by bracket 55 to one of the side members 37 of framework 38.

Cam 53 is provided with an axial cam surface having a progressively increasing high point 57 and dwell 58. Cam surface 57 is operable against conveyor 3 through the medium of roller 59 secured as by bracket 60 to cross member 61 of framework 38. Cam 53 is rotatably mounted on stub shaft 62 rigidly secured as by bracket 63 to cross member 64. Cross member 64 is rigidly secured as at 65 to opposite side members 42 of framework 2.

Cam 53 is continuously driven through the medium of gears 66 and 67, shaft 68 and gears 69 and 70. Shaft 68 is journaled in suitable bearings 71 rigidly secured as by brackets 72 to side members 42 of framework 2. Gears 66 and 67, respectively, are pinioned to cam 53 and shaft 68 for mesh with one another. Gears 69 and 70, respectively, are pinioned to shafts 68 and 16 for mesh with one another.

The form of transfer mechanism shown in Figures 1 and 2 of the drawings comprises a plurality of stripper fingers 73 adapted for oscillatory movement to strip individual cut slices from strands 31 of conveyor 3 and to deposit the same onto conveyor 4.

Fingers 73 are rigidly secured as at 74 to shaft 75 and are alternately spaced relative to strands 31 so that when in slice receiving position fingers 73 will interfit between and below the conveying surfaces of strands 31. Shaft 75 is journaled in suitable bearings 76 rigidly secured within side members 37 of framework 38 and side 77 of gear housing 78.

Fingers 73 are normally urged into slice delivery position relative to conveyor 4 by the action of coil springs 79 against the shaft 75. Springs 79 are rigidly secured at one end as in openings 80 in shaft 75 and at their opposite ends as in openings 81 in bearings 76. Fingers 73 are alternately urged against the action of springs 79 and into stripper position relative to conveyor 3 through the medium of gear wheels 82 and 83, mutilated gear 84 provided with radial trip lug 85 and axial cam 86 provided with alternately arranged high points 87 and dwells 88.

Gear wheel 82 is pinioned to shaft 75. Gear wheel 83 is rotatably mounted on trunnion 89 for mesh with gear wheel 82. Mutilated gear 84 is rotatably mounted on trunnion 90 for mesh with gear wheel 83. Cam 86 is pinioned to driven shaft 34 and is adapted to alternately engage and disengage radial lug 85 through the medium of high points 87 and dwells 88. Trunnions 89 and 90 are rigidly secured between one of the side members 37 and side 77 of gear housing 78.

As shown in Figure 1 each of the fingers 73 may be bent at its free end at a right angle to provide a grab prong 91 to prevent throwing of the slice 27 during rapid movement of the fingers from slice stripping position relative to conveyor 3 to slice delivery position relative to conveyor 4.

The movements of cutter 6, conveyors 3 and 4 and transfer mechanism 30 are synchronized one relative to the other through the medium of the several gear arrangements hereinbefore described. In operation, forward bodily movement of conveyor 3 is at a slightly lesser rate of speed than the conveying movement of conveyor 4. Thus it will be seen that cut slices 27 fall onto conveyor 3 and are rapidly carried to the discharge end of conveyor 3, whence the fingers 73, being operated in synchronism with the conveying movement of conveyor strands 31 and cutter 6, serve to successively strip the slices 27 from conveyor 3 and to deposit the same onto conveyor 4. The deposit of slices 27 onto conveyor 4 in overlapped relationship is effected by forward bodily movement of conveyor 3 at a lesser rate of speed than the conveying movement of conveyor 4.

Following the deposit onto conveyor 4 of the desired number of slices of a group of slices, conveyor 3 and transfer mechanism 30 are rapidly retracted to their rearwardmost position whence a space is provided between the slice last deposited onto conveyor 4 and the next succeeding slice, thus providing a suitable space between successive groups of slices deposited onto conveyor 4. This latter movement, it will be seen, is effected by proper timing of the cam 53 and the action of spring 52.

The form of transfer mechanism 30 shown in Figures 5 to 8, inclusive, comprises, in combination, a plurality of stripper fingers 92 and presser fingers 93.

Fingers 92 are rigidly secured as at 94 to shaft 95. Shaft 95 is journaled in suitable bearings 96 rigidly secured within side members 37 of framework 38 and side 97 of gear housing 98. Fingers 92 are alternately spaced relative to strands 31 and are normally maintained in a horizontal slice receiving position between and below the conveying surface of strands 31 by the action of coiled springs 99 against shaft 95. Springs 99 are rigidly secured at one end as in openings 100 in shaft 95 and at their opposite end as in openings 101 in bearings 96.

Movement of fingers 92 against the action of springs 99 is effected through the medium of gear wheels 102 and 103, mutilated gear 104 provided with trip lug 105 and cam 106. Gear wheel 102 is pinioned to shaft 95. Gear wheel 103 is rotatably mounted on trunnion 107 for mesh with gear wheel 102. Mutilated gear 104 is rotatably mounted on trunnion 108 for mesh with gear wheel 103. Cam 106 is pinioned to driven shaft 34 and is provided with an axial cam surface 109 engageable with trip lug 105. Trunnions 107 and 108 are rigidly secured to one of the side members 37 of framework 38.

Fingers 93 are rigidly secured as at 110 to risers 111 slidably mounted through openings 112 provided in cross member 113 rigidly secured as at 114 to side members 37 of framework 38. Risers 111 are rigidly secured as at 114 to crosshead 115. As shown in Figure 8 movement of fingers 93 is effected through the medium of gear wheels 116, 117, 118 and 119 and toothed rack 120. Gear wheel 116 is pinioned to driven shaft 95. Gears 117 and 118 are pinioned to shaft 121, the gear wheel 117 being adapted for mesh with gear wheel 116. Gear wheel 119 is rotatably mounted on trunnion 122 for mesh with gear wheel 118. Rack 120 is rigidly secured as at 123 to crosshead 115 and meshes with gear wheel 119. Trunnions 121 and 122 are rigidly secured to side 97 of gear housing 98.

It will be seen that gear wheels 117 and 118 provide a gear ratio for accelerating movement of presser fingers 93 relative to the movement of fingers 92 so that fingers 92 and 93 will reach simultaneously the extreme of their delivery and presser positions respectively relative to conveyor 4, as shown in dotted lines in Figure 7.

In operation, cut slices 27 falling onto conveyor 3 are rapidly carried to the discharge end of conveyor 3 and are stripped from conveyor 3 by fingers 92. Following each stripping action fingers 92 are oscillated to drop the stripped slice onto conveyor 4 and simultaneously fingers 93 are moved into pressing action against the dropped slice whereby each slice is pressed against the slice of the group previously deposited onto conveyor 4.

The deposit of the slices 27 onto conveyor 4 in overlapping relationship, and in spaced groups of slices of a predetermined number is effected by bodily movement of conveyor 3 longitudinally of conveyor 4 in the manner hereinbefore described.

I claim:

1. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor and means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor.

2. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor and means including a cam operatively connected with the receiver conveyor for bodily moving the receiver conveyor in the direction of movement of the delivery conveyor at a lesser rate of speed than the speed of the delivery conveyor during deposit of the desired number of slices of a group of slices onto the delivery conveyor and a coil spring operable to rapidly, bodily return the receiver conveyor in the direction counter to the direction of movement of the delivery conveyor following deposit of the desired number of slices of a group of slices onto the delivery conveyor.

3. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor and means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor.

4. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means including a cam operatively connected with the receiver conveyor to bodily move the receiver conveyor in the direction of movement of the delivery conveyor at a lesser rate of speed than the speed of the delivery conveyor during deposit of the desired number of slices of a group of slices onto the delivery conveyor and a coil spring operable to rapidly, bodily return the receiver conveyor in the direction counter to the direction of movement of the delivery conveyor following deposit of the desired number of slices of a group of slices onto the delivery conveyor.

5. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor and means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory stripper means for receiving the cut slices from the receiver conveyor and for depositing the same onto the delivery conveyor.

6. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory stripper means adapted for receiving the cut slices from the receiver conveyor and for depositing the same onto the slice delivery conveyor and means including a cam and gear arrangement and coil spring arrangement operatively connected with the receiver conveyor and the transfer means for oscillating the stripper means.

7. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor and means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a plurality of oscillatory stripper fingers for stripping the cut slices from the receiver conveyor and for depositing the same onto the delivery conveyor.

8. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a shaft, a plurality of stripper fingers rigidly secured to the shaft and means oscillating the shaft and fingers to alternately strip the cut slices from the receiver conveyor and to deposit the same upon the delivery conveyor.

9. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a shaft, a plurality of stripper fingers rigidly secured to the shaft and means including a cam and gear arrangement and a spring arrangement operatively connected with the receiver conveyor and with the shaft to oscillate the shaft and fingers to alternately receive cut slices from the receiver conveyor and to deposit the same onto the delivery conveyor.

10. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory shaft, a plurality of stripper fingers rigidly secured to the shaft and alternately operable to strip cut slices from the receiver conveyor and to deposit the same onto the delivery conveyor, means operable against the shaft to normally urge the fingers into slice delivery position to deliver the slices onto the delivery conveyor and means operable against the shaft to alternately return the fingers to slice receiver position to strip the slices from the receiver conveyor.

11. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory shaft, a plurality of fingers rigidly secured to the shaft to alternately strip cut slices from the receiver conveyor and to deposit the same onto the delivery conveyor and means oscillating the shaft comprising a gear wheel rigidly secured to the shaft, a mutilated gear provided with a radial trip lug operatively connected with the gear wheel and a driven cam having surfaces alternately engageable and disengageable with the lug.

12. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory stripper means for receiving the cut slices from the receiver conveyor and for depositing the same onto the delivery conveyor and means operable to press each succeeding slice against the slice of a group previously deposited onto the delivery conveyor.

13. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising an oscillatory stripper means for receiving the cut slices from the receiver conveyor and for depositing the same onto the delivery conveyor and means mounted above the stripper means and reciprocally operable to press each succeeding slice against the slice of a group previously deposited onto the delivery conveyor.

14. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a shaft, a plurality of stripper fingers rigidly secured to the shaft, means oscillating the shaft and fingers to alternately strip the cut slices from the receiver conveyor and to deposit the same upon the delivery conveyor, a plurality of presser fingers mounted above the stripper fingers and means reciprocating the presser fingers in synchronism with the stripper fingers to press each succeeding slice against the slice of a group previously deposited onto the delivery conveyor.

15. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a shaft, a plurality of stripper fingers rigidly secured to the shaft, means including a cam and gear arrangement and a presser arrangement operatively connected with the receiver conveyor and with the shaft to oscillate the shaft and fingers to alternately receive cut slices from the receiver conveyor and to deposit the same onto the delivery conveyor, a plurality of presser fingers mounted above the stripper fingers and means including a gear and rack arrangement operatively connected with the shaft and with the presser fingers to reciprocate the presser fingers in synchronism with the stripper fingers to press each succeeding slice against the slice of a group previously deposited onto the delivery conveyor.

16. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor, means for bodily moving the receiver conveyor in the direction of movement of the delivery conveyor at a lesser rate of speed than the speed of the delivery conveyor during deposit of the desired number of slices of a group of slices onto the delivery conveyor and for rapidly, bodily returning the receiver conveyor in the direction counter to the direction of movement of the delivery conveyor following deposit of the desired number of slices of a group of slices onto the delivery conveyor, the transfer means comprising a shaft, a plurality of stripper fingers rigidly secured to the shaft, means including a cam and gear arrangement and a presser arrangement operatively connected with the receiver conveyor and with the shaft to oscillate the shaft and fingers to alternately receive cut slices from the receiver conveyor and to deposit the same onto the delivery conveyor, a plurality of presser fingers mounted above the stripper fingers and means including a gear and rack arrangement operatively connected with the shaft and with the presser fingers to reciprocate the presser fingers in synchronism with the stripper fingers to press each succeeding slice against the slice of a group previously deposited onto the delivery conveyor, the presser fingers being operated at a faster rate of speed than the stripper fingers so that the presser fingers and the stripper fingers respectively will reach simultaneously the extreme of their presser and delivery movements.

17. In combination with a delivery conveyor and a timed delivery means mounted relative to the delivery conveyor, means mounted intermediate the delivery conveyor and the delivery means to receive successively a material as delivered by the delivery means and to deposit the same onto the delivery conveyor in groups of a predetermined number comprising a receiver conveyor having a conveyor flight movable in the direction of movement of the delivery conveyor and being bodily movable longitudinally of the delivery conveyor, means for continuously operating the conveyor flight and means for bodily moving the receiver conveyor in the direction of movement of the delivery conveyor at a lesser rate of speed than the speed of the delivery conveyor during deposit of the desired number of the material onto the delivery conveyor and for rapidly, bodily returning the receiver conveyor in the direction counter to the direction of movement of the delivery conveyor following deposit of the desired number of material onto the delivery conveyor.

18. In combination with a delivery conveyor and a timed delivery means mounted relative to the delivery conveyor, means mounted intermediate the delivery conveyor and the delivery means to receive successively a material as delivered from the delivery means and to deposit the same onto the delivery conveyor in groups of a predetermined number comprising a receiving conveyor having a conveyor flight operable in the direction of movement of the delivery conveyor and being bodily movable longitudinally of the delivery conveyor, means for continuously operating the conveyor flight, means for bodily moving the receiver conveyor in the direction of movement of the delivery conveyor at a lesser rate of speed than the speed of the delivery conveyor during deposit of the desired number of material onto the delivery conveyor and for rapidly, bodily returning the receiver conveyor in the direction counter to the direction of movement of the delivery conveyor following deposit of the desired number of the material onto the delivery conveyor, and transfer means at the discharge end of the receiver conveyor comprising an oscillatory stripper means for removing the material from the receiver conveyor and for depositing the same onto the delivery conveyor.

19. In combination with a delivery conveyor and a timed delivery means mounted relative to the delivery conveyor, means mounted intermediate the delivery conveyor and the delivery means to receive successively a material from the delivery means and to deposit the same onto the delivery conveyor in groups of a predetermined number comprising a receiver conveyor having a conveyor flight movable in the direction of movement of the delivery conveyor and means bodily movable longitudinally of the delivery conveyor, means for continuously operating the conveyor flight, means for bodily moving the receiver conveyor in the direction of movement of the delivery conveyor at a lesser rate of speed than the speed of the delivery conveyor during deposit of the desired number of the material onto the delivery conveyor and for rapidly, bodily returning the receiver conveyor in the direction counter to the direction of movement of the delivery conveyor following deposit of the desired number of the material onto the delivery conveyor, and transfer means at the discharge end of the receiver conveyor comprising an oscillatory shaft, a plurality of stripper fingers rigidly secured to the shaft and alternately operable to strip individually the material from the receiver conveyor and to deposit the same onto the delivery conveyor, means operable against the shaft to normally urge the fingers into delivery position relative to the delivery conveyor and means operable against the shaft to alternately return the fingers to stripper position relative to the receiver conveyor.

20. In combination with a delivery conveyor and a timed delivery means mounted relative to the delivery conveyor, means mounted intermediate the delivery conveyor and the delivery means to receive individually a material from the delivery means and to deposit the same onto the delivery conveyor in groups of a predetermined number comprising a receiver conveyor having a flight movable in the direction of movement of the delivery conveyor and being bodily movable longitudinally of the delivery conveyor, means for continuously operating the conveyor flight, means for bodily moving the receiver conveyor in the direction of movement of the delivery conveyor at a lesser rate of speed than the speed of the delivery conveyor during deposit of the desired number of the material onto the delivery conveyor and for rapidly, bodily returning the receiver conveyor in the direction counter to the direction of movement of the delivery conveyor following deposit of the desired number of the material onto the delivery conveyor, and transfer means at the discharge end of the receiver conveyor comprising an oscillatory shaft, a plurality of fingers rigidly secured to the shaft to alternately strip the material from the receiver conveyor and to deposit the same onto the delivery conveyor, means operable against the shaft to normally urge the fingers into delivery position relative to the delivery conveyor and means operable against the shaft to alternately return the fingers to stripper position relative to the receiver conveyor, said last-mentioned means comprising a gear wheel rigidly secured to the shaft, a mutilated gear provided with a radial trip lug operatively engageable with the gear wheel and a driven cam having surfaces alternately engageable and disengageable with the lug.

21. In combination with a delivery conveyor and a timed delivery means mounted relative to the delivery conveyor, means mounted intermediate the delivery conveyor and the delivery means to receive successively a material delivered by the delivery means and to deposit the same onto the delivery conveyor in groups of a predetermined number comprising a receiver conveyor having a flight movable in the direction of movement of the delivery conveyor and being bodily movable longitudinally of the delivery conveyor, means for continuously operating the conveyor flight, means for bodily moving the receiver conveyor in the direction of movement of the delivery conveyor at a lesser rate of speed than the speed of the delivery conveyor during deposit of the desired number of the material onto the delivery conveyor and for rapidly, bodily returning the receiver conveyor in the direction counter to the direction of movement of the delivery conveyor following deposit of the desired number of the material onto the delivery conveyor, transfer means at the discharge end of the receiver conveyor comprising a shaft, a plurality of stripper fingers rigidly secured to the shaft, means including a cam and gear arrangement operatively connected with the receiver conveyor and with the shaft to operate the shaft and fingers to alternately receive individually the material from the receiver conveyor and to deposit the same onto the delivery conveyor, and a plurality of reciprocally operable presser fingers mounted above the stripper fingers and means including a gear and rack arrangement operatively connected with the shaft and with the presser fingers to reciprocate the presser fingers in synchronism with the stripper fingers to press each succeeding piece of material relative to the surface of the delivery conveyor.

22. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor and means for bodily moving the receiver conveyor in one direction at a lesser rate of speed than the speed of the delivery conveyor during deposit of the desired number of slices of a group of slices onto the delivery conveyor and for rapidly, bodily returning the receiver conveyor in the opposite direction following deposit of the desired number of slices of a group of slices onto the delivery conveyor.

23. In combination with a slicing machine and a slice delivery conveyor mounted relative to the slicing machine, means mounted intermediate the slicing machine and the delivery conveyor to receive the individual cut slices severed by the slicing machine and to deposit the same onto the delivery conveyor in overlapping relationship and in groups of a predetermined number comprising a slice receiver conveyor bodily movable longitudinally of the delivery conveyor, transfer means at the discharge end of the receiver conveyor for transferring the individual slices from the receiver conveyor onto the delivery conveyor and means for bodily moving the receiver conveyor in one direction at a lesser rate of speed than the speed of the delivery conveyor during deposit of the desired number of slices of a group of slices onto the delivery conveyor and for rapidly, bodily returning the receiver conveyor in the opposite direction following deposit of the desired number of slices of a group of slices onto the delivery conveyor.

CHARLES T. WALTER.